United States Patent Office 3,206,318
Patented Sept. 14, 1965

3,206,318
REFRACTORY MATERIAL
Toshiyoshi Yamauchi, Meguro-ku, Tokyo, and Hiroshige Suzuki, Ohta-ku, Tokyo, Japan, assignors to Showa Denko Kabushiki Kaisha, Tokyo, Japan, a corporation of Japan
No Drawing. Filed July 26, 1961, Ser. No. 126,864
Claims priority, application Japan, Apr. 25, 1961, 36/14,245, 36/14,246
2 Claims. (Cl. 106—55)

This invention relates to refractory articles having silicon nitride sinters as their principal component, as well as refractory articles which use silicon nitride as their bonding material. More particularly, the invention relates to a method of nitriding metallic silicon, in which as the nitriding catalyst is used (a) at least one primary substantce selected from the group consisting of metallic vanadium, the inorganic compounds thereof, and mixtures thereof; or (b) that comprising (a) in which has been incorporated at least one secondary substance selected from the group consisting of metallic cobalt, manganese, chromium, copper, nickel, iron, barium, and calcium and the inorganic compounds thereof (in other words, using a nitriding catalyst which contains vanadium and/or the inorganic compounds thereof as the primary or essential catalytic material), as well as relating to a silicon nitride refractory article, principally composed of silicon nitride sinters sintered by such a method, which especially excels in its resistance to oxidation at elevated temperature. The invention also relates to a refractory article in which granular refractory material such as alumina, zirconia, beryllia, thoria, and silicon carbide are bonded with silicon nitride such as described hereinabove.

Silicon nitride is known for its possession of various excellent properties, namely, its small thermal expansion, great thermal conductivity, strength at high temperatures, hardness and its great resistance to corrosion. And it is used as refractory article in various forms such in sinters used singly or in the form of sinters containing granular refractory material such as alumina, beryllia, thoria and silicon carbide.

However, the oxidation of silicon nitride begins even at a point below about 900° C., becomnig quite noticeable when about 1200° C. or higher is reached. Therefore, although silicon nitride refractory articles and refractory articles having as their bonding material silicon nitride are completely satisfactory for use in those instances where resistance to oxidation is not demanded, in those usages in which it will be subjected to an oxidizing atmosphere it is difficult to guarantee its safe use over a long period of time unless there has been established measures for preventing the oxidation of the silicon nitride.

A primary object of the present invention is to provide refractory articles having as their principal component silicon nitride sinters which manifest excellent performance over a long period of hours at high temperature, this object being attained by controlling to a certain extent the oxidation of the silicon nitride such as mentioned hereinabove, thereby preventing the deterioration resulting therefrom.

Another object of the invention is to provide refractory articles made of granular refractory materials such as alumina, zircon and silicon carbide which have been bonded with silicon nitride, in which the defects existing in those hitherto used such as described above have been improved as to make possible their safe use over a long period of time in an oxidizing atmosphere of high temperature.

In order to attain the above objects, it is necessary first of all to devise means for efficiently nitriding silicon.

Accordingly, a still another object of the invention is to provide such an effective method of nitriding silicon as well as a nitriding catalyst for this purpose.

As a result of a systematic investigation concerning catalysts for promoting the nitriding of silicon, we found that besides those which were hitherto well known such as iron and ferric oxide or $CaF_2$ and $BaF_2$ the metals belonging to the group of transition elements such as Cu, Co, Ni, Cr, Mn and V were very effective when used as catalysts for promoting the nitriding of silicon.

While the functional mechanism of these catalyst have not been made clear as yet, it is thought that these metals by entering into silicon and silicon nitride operate to promote the diffusion of the atoms. Hence, if the catalyst is such that by its contact with silicon during the nitriding treatment step or before this step is reached it forms any of the various metals enumerated hereinabove, it need not necessarily be a free metal. The oxides, halides, sulfides, sulfates, carbonates and other compounds of these metals or alloys, etc. may also be likewise used. However, as to those compounds which tend to volatilize readily at extremely low temperatures such as, for example, $FeCl_3$, $MnCl_2$, etc. their effectiveness is very limited.

These catalysts may be used moreover by mixing one or more of them together, and the quantity to be added is suitably about 0.1–2 mols in terms of the metallic element to 100 mols of the silicon contained in the mixture for making the sinter, the most preferred rate being 0.5–1 mol. The quantity required varies depending on the viscosity, melting point and other properties of the metal or of the compounds used. And while at times tolerable results can be expected from using less than 0.5 mol, if less than 0.1 mol, satisfactory results cannot be hoped for. On the other hand, when above 1 mol the enhancement in the results is not commensurate with the increase in the quantity. And since detrimental effects are observed with respect to heat resistance when the quantity exceeds 2 mols, the use of such amounts are not recommended. The discovery of these new catalysts is of very great significance in making possible the manifestation by silicon of a powerful bonding action by completely nitriding it at as low a temperature as possible and moreover in a short number of hours.

On the other hand, as a result of our researches concerning the oxidizable property of silicon nitride, we found that the silicon nitride containing such as Cu, Cr, Ni, Co and Mn obtained by the nitriding of silicon powder to which had been added respectively the oxides of such as Cu, Cr, Ni, Co and Mn were, in the range of 900°–1450° C., as compared with silicon nitride of high purity, in all cases more susceptible to oxidation. That is to say, these catalysts have the defect that would make a silicon nitride bonded structure susceptible to oxidation. However, it goes without saying that this type of silicon nitrides are fully satisfactory for those usages in which resistance to oxidation is not demanded. While to add a small quantity of such as the powders of the hitherto-konwn iron, ferric oxide or calcium fluoride to silicon powder is also effective in completing the nitriding effeciently at a low temperature, the thus obtained silicon nitride is likewise susceptible to oxidation. On the other hand, while the nitrided silicon obtained by using silicon of high purity is quite resistant to oxidation, its complete nitriding without the use of a catalyst is not easy.

As a result of our studies covering a still wider scope in regard to this matter, we found that a silicon nitride containing vanadium withstood oxidation better than nitrided silicon of high purity when judged over a long period of time. Namely, while silicon nitride containing vanadium was most susceptible to oxidation when compared with silicon nitride of high purity or that containing iron, manganese, cobalt, etc. when the period of its use was short, over a longer period of time it was the most resistant to oxidation. In other words, although the rate of oxidation is low in case of a sinter of high purity, when this continues constantly it finally results in a large amount of oxidation. On the other hand, in case of the silicon nitride containing a suitable amount of vanadium, although its oxidation at first proceeds rapidly, upon reaching a certain amount the rate of oxidation abruptly falls and finally comes to almost a standstill.

For example, the sinter obtained by adding and mixing 3.5 wt. percent of $V_2O_5$ (equivalent to 1 mol percent in terms of free vanadium) to commercially available silicon powder, then molding and thereafter completely nitriding it is particularly susceptible to oxidation as compared with the silicon nitride sinters containing such as Co, Ni, Cr, Mn, Cu or Fe. However, after oxidizing for awhile at a high temperature such as 950°–1450° C., the $SiO_2$ formed as a result of the oxidation by a unique action proceeds to fill up the spaces in the sinter ingeniously. Hence the porosity of the sinter suddenly decreases, and in concomitance therewith the rate of oxidation also decreases as to result in the oxidation to become a state in which it is practically at a standstill in from several to several tens of hours.

When $V_2O_5$ contacts silicon in a high temperature nitrogen, it is reduced to a lower oxide such as $V_2O_3$ or to vanadium and serves to promote the nitriding of silicon as described hereinabove. However, when it is subsequently exposed to an oxidizing atmosphere, it is thought that by being oxidized again it becomes $V_2O_5$ and acts as such. Therefore, similar actions can be expected of the compounds other than $V_2O_5$, namely $V_2O_3$, metavanadic acid salts, and other compounds containing vanadium. In fact, results of experiments have proved this supposition to be correct. Thus, vanadium, as has been described, performs in succession the action of promoting the nitriding of silicon, then the action of promoting the oxidation of the resultant silicon nitride, followed by the action of inhibiting the oxidation of the sinter.

The quantity of the vanadium (expressed in terms of the free metal) to be mixed with the silicon powder for obtaining sinters of silicon nitride possessing great resistance to oxidation is about 0.1–2 mols to each 100 mols of silicon, a quantity that is about the same as in case it is used only for promoting nitriding being sufficient. As will be described later, while the proper amount of the vanadium to be used will vary when this mixture is used for bonding the various kinds of granular refractory materials depending on such as the other elements that are to be present together, the porosity of the molded product as well as the quantity used of the granular refractory material, in general, about 0.1–2.5 mols give good results.

The action of the vanadium such as mentioned hereinbefore that has been added to the metallic silicon is not impeded in the least even though there are present together therein other catalysts for promoting nitriding such as the aforementioned Co, Cr, Mn, Fe, Cu, Ni, Ba and Ca so long as the quantity contained is proper. Rather, by the addition of these catalysts the nitriding becomes much more accelerated than in case of the use of vanadium singly, and not only does their use conduce to bringing about the desirable result of making possible the reduction in the amount used of the relatively high cost vanadium but also there are cases when the oxidation inhibiting action of the vanadium is promoted. The limits of the quantity to be used of the nitriding catalysts other than vanadium, on the other hand, will vary depending on the quantity of vanadium added and numerous other factors, but it is up to about 1.5 mols to each 100 mols of silicon. Since the properties at high temperature will suffer if the amount is excessive, it is preferable that it be held to below about 1 mol. These catalysts may not only be added as metallic powders as described hereinbefore but also in the form of their corresponding compounds.

Furthermore, according to the invention, by adding together with vanadium and the other nitriding catalysts a fine powder of silicon carbide at the rate of about 5–100 parts by weight to 100 parts of the silicon the resistance to oxidation can be enhanced still more. This is due to the fact that while silicon carbide is at first simultaneously oxidized with the silicon nitride at high temperatures, at the same time it forms a great quantity of $SiO_2$ in excess of that oxidized as to result in speeding up the lowering of the porosity. In addition, if silicon carbide is present, the $V_2O_5$ being reduced and becoming $V_2O_3$ the oxidation promoting action is stopped. While the particle size of the silicon carbide used should be as fine as is feasible, if finer than about 300 mesh, fully satisfactory results are manifested.

The silicon nitride sinters that have been obtained by the wide variety of mixtures as described hereinbefore, when further calcined at 1050°–1450° C. in an oxidizing atmosphere, become compact sinters with their apparent porosity having decreased greatly. The sinters which have been treated thus, manifest properties that are great-

*Table I*

| Ex. | Proportions by weight to 100 parts of metallic silicon powder [1] | | | | | | | |
|---|---|---|---|---|---|---|---|---|
| | Vanadium compound | | Catalyst A | | Catalyst B | | Silicon carbide [2] | Dextrin [3] |
| 1 | $V_2O_5$ | 3.5 | | | | | | 2 |
| 2 | $V_2O_5$ | 3 | | | | | | 2 |
| 3 | $V_2O_5$ | 3 | $MnCO_3$ | 1 | | | | 2 |
| 4 | $V_2O_5$ | 3 | | | $\{Fe_2O_3$ $CaF_6\}$ | 0.5 | | 2 |
| 5 | $V_2O_5$ | 3 | $\{Co_2O_3$ $MnCO_3\}$ | 0.5 0.5 | | | | 2 |
| 6 | $NH_4VO_3$ | 5 | $\{NiSO_4 \cdot 7H_2O$ $CuSiF_6\}$ | 0.5 0.5 | $BaF_2$ | 1 | | 2 |
| 7 | $V_2O_3$ | 2.5 | $\{Cr_2O_3$ $Cu_2O\}$ | 0.5 0.2 | $Fe_2O_3$ | 1 | | 2 |
| 8 | $V_2O_3$ | 2.5 | $Co_2O_3$ | 0.5 | $\{Fe_2O_3$ $CaF_2\}$ | 0.5 0.5 | | 2 |
| 9 | $V_2O_3$ | 4 | $Co_2O_3$ | 1 | | | 20 | 2.5 |
| 10a | $V_2O_5$ | 8 | $Co_2O_2$ | 2 | | | 100 | 4 |
| 10b | | | $Cu_2O$ | 2.5 | | | 100 | 4 |
| 11 [4] | | | $Co_2O_2$ | 0.5 | $Fe_2O_3$ | 0.5 | | 2 |

[1] Commercially available silicon powder containing 0.9% Fe and 0.7% Cr. Ground to finer than 200 mesh, 50% of those below 44μ, being contained.
[2] Those of below 44μ used.
[3] Temporary binder.
[4] Control sample not containing vanadium.

ly superior depending upon the use to which they are applied, since at temperatures less than their treatment temperatures their resistance to oxidation becomes much greater.

Next, the invention will be described in further detail by means of the following examples.

EXAMPLES 1–11

For preparing the silicon nitride sinters intended by the present invention, the commercially available metallic silicon powder was used, and the mixtures were as in Table I. Vanadium and the nitriding promoting catalysts were both used chiefly in the forms of their compounds considering their convenience.

When the principal ones of those given in Table I are converted from the proportions by weight as given therein to molar proportions, the corresponding values are as follows: namely, the 3 of $V_2O_5$ is about 0.92, the 8 thereof is about 2.5, and in case of $Co_2O_3$, the 0.5 of it is about 0.17 and the 2 thereof is about 0.67. The nitriding catalyst A is that newly revealed by this invention, while catalyst B is that which has been known hitherto as having great nitriding promoting effects.

After having thoroughly mixed the ingredients given in Table I, followed by adding of a small amount of water and kneading, they were formed into cylindrical pieces 3 cm. in diameter and 3 cm. long using metallic molds and application of a pressure of 500 kg./cm.$^2$. After thorough drying, they were placed in a muffle, the air therein was substituted with pure nitrogen, and then while continuing the circulation of nitrogen the temperature was raised at the rate of 300° C./hour. After having imparted heat treatment at 1300°–1380° C. for 12 hours and further at 1420° C. for 4 hours, they were cooled by flowing nitrogen over them, whereby the intended silicon nitride sinters were obtained.

By this treatment weight increases in each of the sinters on the basis of the quantities of silicon that were respectively mixed were observed as shown in Table II. From these facts it can be seen that the silicon has been completely converted to silicon nitride. Further, it can be seen from the samples of Examples 9 and 10 that the surface of the silicon carbide has also been nitrided considerably. The fact that the weight increases of the samples of Examples 1–8 are somewhat less than the theoretical value (about 66%) is due to the volatilization of the silicon. The results of the measurements of the true specific gravity and X-ray diffractions have confirmed the absence of residual silicon.

The results of measurements made of the principal physical properties of the thus obtained silicon nitride sinters are given in Table II.

*Table II*

| Ex. | Rate of weight increase resulting from nitriding (wt. percent based on silicon used) | Apparent porosity (percent) | Thermal expansion (percent up to 1000° C.) | Compressive strength (ton/cm.$^2$) |
|---|---|---|---|---|
| 1 | 62 | 33.1 | 0.30 | 1.8 |
| 2 | 63 | 29.3 | 0.29 | 2.4 |
| 3 | 63 | 28.2 | 0.29 | 2.5 |
| 4 | 61 | 32.9 | 0.28 | 1.6 |
| 5 | 63 | 27.7 | 0.30 | 2.7 |
| 6 | 60 | 38.5 | 0.28 | 1.3 |
| 7 | 61 | 36.4 | 0.28 | 1.5 |
| 8 | 62 | 30.3 | 0.29 | 2.2 |
| 9 | 66 | 30.4 | 0.31 | 2.2 |
| 10a | 70 | 29.1 | 0.37 | 1.8 |
| 10b | 63 | 29.5 | 0.36 | 1.9 |
| 11 | 63 | 29.0 | 0.29 | 2.5 |

That the silicon nitride sinters that have been obtained by doing as above possess excellent properties is truly indicated by the data presented in Table II. Next, rod-like samples 7 mm. x 7 mm. x 30 mm. which were cut from these sinters and were exposed to a current of oxygen for a long number of hours at 1200° C. were measured for their weight increases. The results are as given in Table III.

*Table III*

| Ex. | Weight increase due to oxidation (percent) | | | | | Porosity (percent)[1] |
|---|---|---|---|---|---|---|
| | 1 hour | 4 hours | 16 hours | 50 hours | 100 hours | |
| 1 | 6.81 | 7.59 | 8.30 | 8.50 | 8.59 | 4.0 |
| 2 | 6.05 | 7.10 | 7.81 | 8.15 | 8.17 | 3.8 |
| 3 | 6.52 | 6.80 | 7.50 | 7.97 | 8.00 | 5.1 |
| 4 | 6.18 | 6.42 | 6.98 | 7.62 | 7.83 | 5.7 |
| 5 | 7.61 | 7.82 | 8.32 | 8.32 | 8.40 | 4.0 |
| 6 | 8.00 | 8.40 | 8.60 | 9.10 | 9.30 | 9.3 |
| 7 | 4.91 | 6.02 | 8.90 | 10.42 | 10.88 | 12.5 |
| 8 | 7.22 | 7.58 | 8.30 | 8.33 | 8.38 | 3.6 |
| 9 | 5.03 | 6.05 | 6.40 | 6.42 | 6.44 | 6.5 |
| 10a | 3.25 | 3.44 | 3.59 | 3.61 | 3.62 | 3.9 |
| 10b | 3.41 | 3.47 | 3.50 | 5.83 | 6.98 | 4.9 |
| 11 | 3.57 | 5.00 | 9.13 | 14.01 | [2]18.10 | 15.3 |

[1] The apparent porosity of those samples which were not tested for oxidation, but were recalcined in air for 2 hours at 1450° C.
[2] Indicates that about 63% of the $Si_3N_4$ has oxidized. The sample tested expanded and assumed a curved form and cracks appeared in a part of it.

As apparent from Table III, the rate of oxidation of a silicon nitride sinter not containing vanadium but containing, for example, a small amount of iron and cobalt only (Ex. 11) is at first relatively slow, but when the oxidation proceeds continuously, 100 hours later more than 60% will have been oxidized. On the other hand, in case of the sinter containing vanadium according to the present invention, although at first it oxidizes rapidly, after about 20 hours have passed, the oxidation reaches a state where it is almost at a standstill. Particularly, in case of the silicon nitride sinters of Examples 9 and 10 which contain a fine powder of silicon carbide, the amount oxidized is especially small and with the oxidation reaching the standstill state at an early stage, their resistance to oxidation is much more enhanced.

When similar oxidation tests were conducted also at 950° C. and 1450° C., the results indicated that as compared with the case at 1200° C., at 950° C. the rate of oxidation during the initial stages was smaller and the time to reach the standstill state of oxidation was longer; whereas at 1450° C. while the rate of oxidation during the initial stages became still greater, the time until the standstill state in the oxidation was reached became very short. That is to say, when viewed as to details there is a difference in the numerical values of the weight increases and the times of the weight increases and the times to reach the state at which oxidation is at a standstill. However, in the long run, these being similar to the case of 1200° C., a similar type of oxidation curve is obtained. Therefore, it can be said that the silicon nitride sinters of the present invention possess resistance to oxidation fully at temperatures ranging from 950° C. to 1450° C. and also even at temperatures somewhat higher.

On the other hand, when the silicon nitride sinters obtained by nitriding the ingredients of Table I were recalcined in an oxidizing atmosphere for about 2 hours at 1450° C., as shown in the rightmost column of Table III, the porosity of practically all of them became small. When these were tested for oxidation at 1200° C., their rate of oxidation was very small, and in practically all of them no longer was it possible to observe a weight increase brought about by oxidation.

Therefore, by utilizing this characteristic of the silicon nitride sinter of the present invention, if in its use, it is calcinated in advance at a temperature slightly higher than the temperature at which it is to be used, it will be able to manifest still better performance depending on the purpose to which it is to be applied.

Thus, according to the invention by suitably molding a mixture comprising as its principal component silicon to which have been added a small quantity of vanadium and, optionally, other nitriding promoting catalysts and further a fine powder of silicon carbide (hereinafter to be referred to as the Si–V mixture), and thereafter nitriding the same at about 1350° C. a strong sinter with good resistance to oxidation is obtained.

Hence, if this Si–V mixture having as its principal silicon powder is added in a suitable quantity to granular refractory materials such as alumina, zircon, and silicon carbide, mixed thoroughly together with a small quantity of clay, bentonite, dextrin and other molding adjuvants, and after molding nitrided, a refractory article bonded with silicon nitride as intended by the invention can be obtained. A refractory obtained in this manner is very difficult to oxidize and can be used safely while maintaining its excellent performance for a long number of hours at high temperatures.

While as the granular refractory materials the aforementioned alumina, zircon and silicon carbide are each used singly in most instance, it is also possible to use a mixture of two or more of them in suitable proportions. The granularity of these may be of fine powder alone or that in which coarse and medium-sized particles have been added as to be a mixture of different-sized particles.

However, in case of silicon carbide, an account of its oxidizability it is preferred that as large an amount of them as is possible be of coarse particles and that they be used with the distribution of the particles being so adjusted to achieve their compact filling.

The quantity of the Si–V mixture having as its principal component silicon which is to be added as the bonding material will be influenced greatly by the nature of the granular refractory materials mixed. If the mixture is a fine powder, a relatively large quantity of the bonding material would be required, while if it is a compactly filled mixture a relatively small quantity would suffice. In the former instance about 30–100 parts by weight of the Si–V mixture to 100 parts by weight of the granular refractory material is suitable, whereas in the latter instance about 10–50 parts by weight is suitable. In general, when the proportion of the Si–V mixture is increased, the thermal expansion decreases and the strength at room temperature and under heat becomes greater, but on the other hand the porosity increases. Accordingly, it is desired that the amount to be used of the bonding material be suitably varied within the aforementioned range in accordance with the use to which the material is to be applied.

The invention will be described in further detail by means of the following examples.

EXAMPLES 12–21

In Table IV are given several examples of the bonding material mixtures for preparing the refractories intended by the present invention. The proportions of the various ingredients are indicated in parts by weight.

*Table IV*

| Si–V system mixture | Si | V compound | | $Co_2O_3$ | $Fe_2O_3$ | $MnCO_3$ | $Cu_2O$ | $CaF_2$ | SiC |
|---|---|---|---|---|---|---|---|---|---|
| A | 100 | $V_2O_5$ | 3.5 | | | | | | |
| B | 100 | $V_2O_5$ | 3 | | 1 | | | | |
| C | 100 | $NH_4VO_3$ | 5 | 0.5 | | | 0.5 | | |
| D | 100 | $V_2O_3$ | 2.5 | 0.5 | 0.5 | | | 0.5 | |
| E | 100 | $V_2O_5$ | 8 | 2 | | | | | 100 |
| F | 100 | | | 0.5 | 0.5 | | | | |
| G | 100 | | | | 0.5 | | | 0.5 | |
| H | 100 | | | | | | 2.5 | | 100 |

The Si is the commercially available silicon (containing 0.9% of Fe and 0.7% of Cr) ground to less than 200 mesh and containing 56% of those less than 44μ. The SiC used was a commercially available product ground to less than 44μ. And, for the sake of convenience in using, the vanadium and the other nitriding catalysts were used in the form of their oxides or carbonates, etc. The quantities added were by proportions by weight. When converted to molar proportions the 3 of the $V_2O_5$ corresponds to about 0.92 mol, and the 0.5 of the $Co_2O_3$ to about 0.17 mol.

In Table V are given examples of mixtures in proportions by weight of the various granular refractory materials, namely zicron, electro-fused corundum and silicon carbide of assorted particles sizes with the various bonding material mixtures given in Table IV.

*Table V*

| Ex. | Zircon | | Electro-fused corundum | | Silicon carbide | | Si–V system bonding material | |
|---|---|---|---|---|---|---|---|---|
| | Particle size | Quantity | Particle size | Quantity | Particle size | Quantity | Table IV symbol | Quantity |
| 12 | Below 80# | 100 | | | | | A | 50 |
| 13 | Below 80# | 100 | | | | | E | 100 |
| 14 | Below 80# | 100 | | | | | G | 100 |
| 15 | | | Below 150# | 100 | | | D | 50 |
| 16 | | | Below 150# | 100 | | | B | 100 |
| 17 | | | Below 150# | 100 | | | F | 100 |
| 18 | | | | | 12# / 46# / 200# | 52 / 33 / 15 | E | 30 |
| 19 | | | | | 12# / 46# / 200# | 52 / 33 / 15 | F | 15 |
| 20 | 80# | 10 | | | 12# / 46# / 200# | 52 / 23 / 15 | C | 20 |
| 21 | | | | | 12# / 46# / 200# | 52 / 33 / 15 | H | 30 |

The ingredients of the respective mixtures given in Table V were thoroughly mixed, following which the adjuvant materials such as given in the following Table VI were added as respectively indicated. After moistening with a small amount of water and thoroughly blending the mixture, the mixture was molded using a metallic mold into cylindrical shapes having a diameter of 30 cm. and length of 30 cm. under a pressure of 500 kg./cm.$^2$.

Table VI

| Ex. | Quantity of mixture (parts by weight) | Bentonite from Yamagata, Japan (parts by weight) | Dextrin (parts by weight) | Ball clay (parts by weight) |
|---|---|---|---|---|
| 12 | 150 |  | 1.5 |  |
| 13 | 200 |  | 1 | 3 |
| 14 | 200 |  | 2 |  |
| 15 | 150 |  | 1.5 |  |
| 16 | 200 |  | 2 |  |
| 17 | 200 |  | 2 |  |
| 18 | 130 | 4 | 2 |  |
| 19 | 115 | 3.8 | 2 |  |
| 20 | 120 | 3.9 | 2 |  |
| 21 | 130 | 4 | 2 |  |

After thorough drying, the product was placed in a muffle, the air therein substituted with pure nitrogen, and while continuing the circulation of nitrogen the temperature was raised at the rate of 300° C./hr. After heat treatment at 1300°–1400° C. for 12 hours and further at 1420° C. for 4 hours, cooling was effected while flowing nitrogen, whereby the intended refractory article bonded with silicon nitride was prepared.

By a treatment such as this, weight increases for each of the samples were observed as shown Table VII. When allowances are made for the Si that volatilizes during nitriding treatment, it can be seen from these results that the silicon in the Si–V mixture has been completely converted to silicon nitride and that the silicon carbide has been partly nitrided also. It was also confirmed from results of measurements of the true specific gravity and X-ray diffractions of the obtained refractory that residual silicon was not present.

The principal physical properties of the thus obtained refractory article of the present invention are as shown in Table VII, below.

Table VII

| Ex. | Weight increase due to nitriding (wt. percent of the silicon used) | Apparent porosity (percent) | Compressive strength (kg./cm.²) |
|---|---|---|---|
| 12 | 62 | 29.3 | 1,630 |
| 13 | 68 | 30.1 | 1,750 |
| 14 | 59 | 32.8 | 1,290 |
| 15 | 61 | 30.2 | 1,460 |
| 16 | 62 | 28.4 | 1,580 |
| 17 | 63 | 29.6 | 1,610 |
| 18 | 75 | 13.8 | 1,730 |
| 19 | 65 | 15.9 | 1,510 |
| 20 | 67 | 16.1 | 1,650 |
| 21 | 72 | 14.1 | 1,700 |

Next, rod-like sample pieces 7 mm. x 7 mm. x 30 mm. were cut from each of these samples, which were then tested for resistance to oxidation. The resistance to oxidation was judged from the weight increases of the samples after they had been exposed at 1100° C. for a long number of hours to a current of oxygen containing 50% steam. These results are as shown in Table VIII, below.

TABLE VIII

| Example | 20 hours | 100 hours | 250 hours |
|---|---|---|---|
|  | Percent | Percent | Percent |
| 12 | 3.05 | 3.30 | 3.60 |
| 13 | 4.12 | 4.22 | 4.41 |
| 14 | 3.21 | 5.15 | ¹ 6.73 |
| 15 | 3.00 | 3.32 | ² 3.78 |
| 16 | 3.94 | 4.13 | ² 4.55 |
| 17 | 3.35 | 5.26 | ¹ 6.99 |
| 18 | 1.91 | 2.10 | 2.20 |
| 19 | 2.51 | 3.89 | 5.90 |
| 20 | 2.40 | 2.80 | 3.15 |
| 21 | 2.46 | 3.38 | 4.90 |

¹ Expanded and curved with occurrence of some cracks.
² Had tendency to expand somewhat.

Since by our experiments it has been confirmed that an oxygen atmosphere containing 50% steam is from several times to ten times as great as dry oxygen in its action of oxidizing silicon nitride or silicon carbide, the results given in Table VIII are equivalent to from a thousand to several thousand hours of testing in air or an atmosphere that is close to it. From this, it should be well understood how excellent the refractory article of the present invention is with respect to its resistance to oxidation. The samples of Examples 14 and 17 which did not contain vanadium at between 100 hours and 250 hours curved because of expansion of its volume and resulted in cracks occurring. While that of Example 19 did not mainfest any notable expansion or curvature, from the fact that its weight increase due to oxidation was 6–20 times those of Examples 18 and 20 during the time between 100 hours and 250 hours, that it would deteriorate is believed as being only a matter of time. While in case of Examples 15 and 16 the weight increase due to oxidation was quite small, tendencies to some expansion was noted. However, it was very slight, and it was considered that they were fully usable depending on the uses to which they were to be applied.

The same oxidation test was conducted also with dry oxygen at 950° C. and 1450° C. Dry oxygen was used, because at 950° C. the oxidation promoting action of steam could not be observed while at 1450° C. it was so intense as to be unrealistic. The results revealed that, as compared with the case at 1100° C., at 950° C. the rate of oxidation in the initial stages was small, but the time until the standstill state in oxidation was reached became long; whereas at 1450° C. while the oxidation in the initial stages became much greater, the time until the standstill state in the oxidation was reached became very short. That is to say, while there is some difference between the rates of weight increases and the times until the standstill state in oxidation is reached, in the long run a similar form of oxidation curve was obtained as in the case of 1100° C. Therefore, it can be said that the refractory articles bonded with the silicon nitride of the present invention fully possess resistance to oxidation at temperatures ranging from 950° C. to 1450° C. And naturally they can be used also at temperatures somewhat higher than this.

Moreover, it became known that when the oxidation of the refractory articles bonded with the silicon nitride containing vanadium of the invention proceeds at a high temperature their porosity decreased very rapidly, and concomitant therewith the resistance to oxidation at temperatures below this temperature was enhanced markedly. Therefore, in using the refractory articles of the present invention by calcining in advance at a temperature slightly higher than the temperature at which they are to be used it becomes possible to obtain still better performances depending upon the uses to which they are to be applied.

Furthermore, besides those mixtures shown in Table IV, bonding materials obtained by using as the nitriding catalysts $Cu_2O$, $CuSiF_6$, NiO, $BaF_2$ and $Cr_2O_3$ or other compounds of these metals which have been partly or wholly substituted with $Fe_2O_3$ and $Co_2O_3$ also gave refractory articles substantially similar to those described hereinbefore. In addition, the mixtures of Examples 12 to 17 of Table V could also be molded by extruding or slip casting, and the products so obtained gave performances that were substantially equal to those obtained as described hereinbefore.

As described above, since the oxidation of the silicon nitride sinters illustrated in Examples 1–10a hardly proceeds even though they are exposed to an oxidizing atmosphere for a long number of hours at high temperatures, they can give full play to the many strong points that are the characteristics of silicon nitride. On the other hand, in case of the refractory articles bonded by the silicon nitride illustrated in Examples 12–20 (except 14, 17, and 19), since the excellent bonding action of the silicon nitride used as the bonding material likewise does not break down even in a high temperature oxidizing atmosphere, the characteristics of the respective granular refractory materials bonded can be fully manifested. Thus all of these refractory articles of the invention are very useful for use as constructional materials, bricks, crucibles, protective tubing, abrasion resisting materials, etc.

Since it is apparent that many changes and modifications can be made in the above-described details without departing from the nature and spirit of the invention, it is to be understood that the invention is not to be limited thereto except as set forth in the appended claims.

Having thus set forth the nature of the invention, what is claimed is:

1. A raw batch for the manufacture of a silicon nitride refractory article, wherein said raw batch consists essentially of metallic silicon powder and about 0.1 to about 2.5 mols, per 100 mols of said metallic silicon, of a nitriding catalyst which contains as an essential ingredient at least one substance selected from the group consisting of metallic vanadium, $C_2O_5$ and $NH_4VO_3$, said mols of said vanadium nitriding catalyst being expressed in terms of free vanadium.

2. The raw batch according to claim 1 wherein silicon carbide having a particle size of +300 mesh is present in an amount in the range of from about 5 to about 100% by weight based on said metallic silicon.

References Cited by the Examiner

UNITED STATES PATENTS

| | | | |
|---|---|---|---|
| 2,618,565 | 11/52 | Nicholson | 106—55 |
| 2,636,826 | 4/53 | Nicholson | 106—57 |
| 2,636,828 | 4/53 | Nicholson | 106—55 |

FOREIGN PATENTS 870,084  6/61  Great Britain.

TOBIAS E. LEVOW, *Primary Examiner.*

JOSEPH REBOLD, *Examiner.*